UNITED STATES PATENT OFFICE 2,496,390

CYCLIC ETHER PEROXIDE CATALYSTS IN THE POLYMERIZATION OF CONJUGATED DIOLEFINS

Henri Martin Guinot, Versailles, France, assignor to Les Usines de Melle (Societe Anonyme) Saint-Leger-les-Melle, France, a company of France No Drawing. Application May 8, 1945, Serial No. 592,716. In France September 7, 1939

Section 1, Public Law 690, August 8, 1946
Patent expires September 7, 1959

7 Claims. (Cl. 260—94.2)

In the specification of Patent Application No. 292,363, now U. S. Patent 2,246,937, entitled "Improvements in the polymerization of di-olefines," the applicant has described a process which consists in utilizing as catalysts the peroxides of tetrahydrofurfurane, or of its homologues, obtained by partial oxidation of the tetrahydrofurfurane or its homologues in an oxidising atmosphere, if necessary in the presence of an oxidising agent like hydrogen peroxide.

It has now been found that the cyclic ethers containing two oxygen atoms in the ring, and their derivatives can be converted in peroxides very readily, and that these peroxides are very good catalysts for promoting the polymerization not only of diolefines but of all compounds which polymerize to give gums or resins. These peroxides can be obtained, in many cases, simply by agitating the corresponding ether in the presence of an oxygen-containing gas (e. g. air). In other cases the peroxidisation requires to be catalysed, e. g., by exposing the ether to daylight or ultra violet radiation, or to be effected by an oxidising agent such as hydrogen peroxide, or carried out under a pressure of oxygen.

The process of catalytic polymerization of compounds which polymerize to give gums or resins, according to the present invention, is therefore characterized by the use of a peroxide of a cyclic ether having two oxygen atoms in the ring or of a derivative of such an ether, as a catalyst.

The present invention also includes a process for the production of the peroxides of the cyclic ethers having two oxygen atoms in the ring, and of the derivatives of such ethers, in which a cyclic ether is agitated in the presence of an oxygen containing gas, or treated with an oxidising agent, and the peroxides so produced.

In carrying out the polymerization process of the present invention, these peroxides may be isolated and used in the pure state but it is more advantageous and more simple to utilize them in solution in the cyclic ether which has given rise to them.

In order to make the range of compounds to which the present invention relates, more clearly understood and to indicate what is meant by the expression "cyclic ethers having two oxygen atoms in the ring and their derivatives," it is convenient to regard 1:4 dioxane:

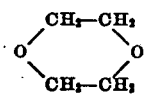

and dioxolane:

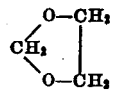

each as the first member of a series of compounds.

The "dioxane series" is thus characterized by the following grouping:

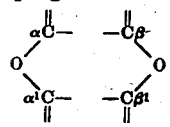

in which the $\alpha$ and $\beta$ carbon atoms, on one hand, and the $\alpha^1$ and $\beta^1$ carbon atoms on the other hand are connected either directly by a simple or unsaturated bond, or indirectly through the intermediary of an organic or hydrocarbon, aliphatic or aryl, saturated or unsaturated radical. The remaining free valencies may be saturated either by hydrogen or by aliphatic or aryl hydrocarbon radicals.

Dioxane and its derivatives may be obtained by two principal methods:

(a) Dehydration of glycols by heating in the presence of phosphoric acid, (b) Saponification of polyethylene chlorhydrins themselves obtained by condensation of olefins oxides with the monochlorhydrins of glycols.

The "dioxolane series" contains the following characteristic grouping:

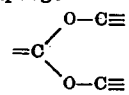

in which the two terminal carbon atoms are connected with each other either directly by a simple or unsaturated bond or through the intermediary of an aliphatic or aryl radical, the remaining free valencies of these carbon atoms, and also of the first carbon atom, being saturated by hydrogen or by any organic radical or radicals of equivalent valency.

These substances are cyclic acetals of the glycols and they may be obtained, in consequence, by making an aldehyde or acetone react on a glycol in the presence of an acid (for example phosporic acid).

In the case of Formol, the reaction is immediate and it suffices to distil the mixture to collect directly a fraction rich in Formol. In the case of the treatment of ethanal or acetone, it is necessary first to let the mixture react in an acid medium.

All these derivatives of dioxane and of dioxolane are obtained with satisfactory yields by the methods indicated above.

Amongst the dioxane and dioxolane derivatives capable of giving, by careful oxidation, useful polymerization catalysts, there may be cited in particular:

Dioxane:

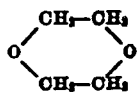

obtained by dehydration of ethylene glycol.

Methyl dioxane:

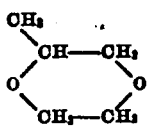

obtained by saponification of the chlorhydrin of methyl-diethylene-glycol.

$\alpha,\alpha^1$ Dimethyl dioxane:

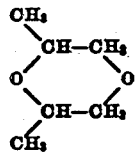

obtained by saponification of the chlorhydrin of dimethyl-diethylene-glycol.

$\alpha,\beta^1$ Dimethyldioxane:

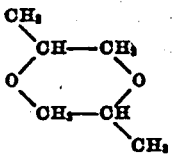

obtained by dehydration of propylene glycol.

$\alpha,\alpha^1,\beta,\beta^1$ Tetramethyl dioxane:

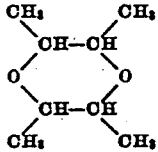

obtained by dehydration of pseudo butylene glycol.

$\alpha,\alpha,\beta^1,\beta^1$ Tetramethyldioxane:

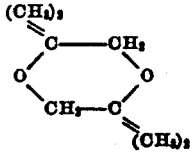

obtained by dehydration of isobutylene glycol.

$\alpha,\beta$ Dimethyl dioxane:

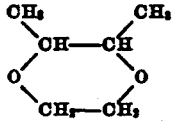

obtained by saponification of the chlorhydrin of dimethyl-diethylene-glycol.

$\alpha,\beta^1$ Diethyl dioxane:

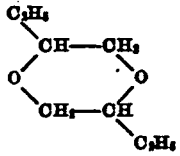

obtained by dehydration of 1:2 butylene glycol.

Dimethyl $\alpha,\gamma^1$ dimethylene dioxane:

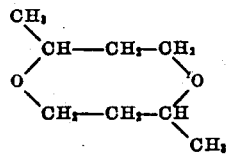

obtained by dehydration of 1:3 butylene glycol.

Dioxolane (ethylene methylene dioxide):

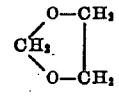

obtained by the action of formaldehyde on glycol.

Methyl dioxolane (ethylene ethylidene dioxide):

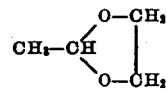

obtained by the action of ethanal on glycol.

Dimethyl dioxolane (ethylene isopropylidene dioxide):

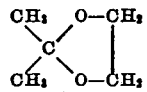

obtained by the action of acetone on glycol.

The following 5 examples illustrate how catalytic polymerization according to the present invention may be carried out.

*Example 1*

$\alpha,\alpha,\beta^1,\beta^1$ Tetramethyl dioxane placed in a flask with a large opening, is shaken in an atmosphere of oxygen, in daylight. At the end of 20 days it has absorbed 10 times its volume of oxygen and constitutes a solution of peroxide.

2 cc. of this solution are added to an emulsion of 50 cc. of butadiene in 50 cc. of a solution of gelatine. After remaining for 100 hours in the cold, 70% of the butadiene is polymerized into a gum possessing good plastic qualities.

If the polymerization is effected at 60°, the duration of the reaction is reduced to 24 hours.

*Example 2*

To an emulsion of 50 cc. of butadiene in 50 cc. of a solution of gelatine containing 1% of a palmitic acid base soap, there is added 2 cc. of $\alpha,\beta^1$ dimethyl dioxane, having absorbed 15 times its volume of oxygen by means of agitation in solar light during 30 days.

After remaining 100 hours in the cold, 80% of the butadiene is polymerized into a gum of good quality.

*Example 3*

By operating under the same conditions as in Example 2, but using as catalyst dimethyl dioxolane containing 7% of peroxides obtained by oxidation in the air assisted by agitation, 30% of the butadiene is transformed into a very plastic gum capable of being advantageously employed in admixture with the gums obtained by a more advanced polymerization.

*Example 4*

50 cc. of vinyl chloride are emulsified in 50 cc. of a solution of gelatine in the presence of 2 cc. of $\alpha,\beta^1$ dimethyl dioxane having absorbed 10 times its volume of oxygen during agitation and exposure to the air and daylight.

At the end of 200 hours 90% of the vinyl chloride is transformed into solid polymers appearing in the form of a white amorphous powder, insoluble in water and the usual organic solvents and resisting acid or alkaline chemical agents very well.

*Example 5*

Operation is exactly as in the preceding example utilizing as catalyst $\alpha,\alpha,\beta^1,\beta^1$ tetramethyl dioxane having absorbed 10 times its own volume of oxygen during agitation and exposure to air and light. It is observed that at the end of 150 hours, 95% of the vinyl chloride is transformed into a product identical to that of the preceding example and possessing the same properties.

The peroxides of cyclic ethers described above give results comparable to the results obtained with the peroxide of tetrahydrofurfurane described in connection with the applicant's prior patent application and present the same advantages from the point of view of safety and ease of production.

What I claim is:

1. In a process for catalytically polymerizing conjugated diolefin hydrocarbons, the improvement that comprises catalyzing the polymerization with a peroxide of a cyclic ether, said ether having one carbon-oxygen nucleus which contains two oxygen atoms and not less than three nor more than six carbon atoms, at least two of said carbon atoms being linked together directly.

2. In a process for catalytically polymerizing conjugated diolefin hydrocarbons, the improvement that comprises catalyzing the polymerization with a peroxide of an unsubstituted cyclic ether, said ether having one carbon-oxygen nucleus which contains two oxygen atoms and not less than three nor more than six carbon atoms, at least two of said carbon atoms being linked together directly.

3. In a process for catalytically polymerizing conjugated diolefin hydrocarbons, the improvement that comprises catalyzing the polymerization with a peroxide of a substituted cyclic ether, said ether having one carbon-oxygen nucleus which contains two oxygen atoms and not less than three nor more than six carbon atoms, at least two of said carbon atoms being linked together directly, and to which not less than one nor more than four methyl substituents are attached.

4. In a process for catalytically polymerizing conjugated diolefin hydrocarbons, the improvement that comprises catalyzing the polymerization with a peroxide of a substituted cyclic ether, said ether having one carbon-oxygen nucleus which contains two oxygen atoms and not less than three nor more than six carbon atoms, at least two of said carbon atoms being linked together directly, and to which not less than one nor more than two ethyl substituents are attached.

5. In a process for catalytically polymerizing conjugated diolefin hydrocarbons, the improvement that comprises catalyzing the polymerization with a peroxide of a cyclic ether, said ether having one carbon-oxygen nucleus which contains two oxygen atoms and not less than three nor more than six carbon atoms, at least two of said carbon atoms being linked together directly, said peroxide being in solution in the cyclic ether from which it was derived.

6. In a process for catalytically polymerizing conjugated diolefin hydrocarbons, the improvement that comprises catalyzing the polymerization with a peroxide of a cyclic ether, said ether having one carbon-oxygen nucleus which contains two oxygen atoms and not less than three nor more than six carbon atoms, at least two of said carbon atoms being linked together directly, at a temperature of 20° to 100° C.

7. In a process for catalytically polymerizing butadiene, the improvement that comprises catalyzing the polymerization with a peroxide of a cyclic ether, said ether having one carbon-oxygen nucleus which contains two oxygen atoms and not less than three nor more than six carbon atoms, at least two of said carbon atoms being linked together directly.

HENRI MARTIN GUINOT.

REFERENCES CITED

The following references are of record in the file of this patent:

UNITED STATES PATENTS

| Number | Name | Date |
|---|---|---|
| 1,070,258 | Hofmann | Aug. 12, 1913 |
| 1,775,882 | Young | Sept. 16, 1930 |
| 2,258,423 | Rust | Oct. 7, 1941 |
| 2,319,576 | Agens | May 18, 1943 |
| 2,388,319 | Fuller | Nov. 6, 1945 |

FOREIGN PATENTS

| Number | Country | Date |
|---|---|---|
| 862,928 | France | Dec. 23, 1940 |

OTHER REFERENCES

Reiche: "De Bendeutung der organischen Peroxyde" etc.: Sammlung chemischer und chemtech. Vortrage, N. F. Heft 34, Ferdinand Enke, Stuttgard (1936), pages 10, 11, and 64–68.